United States Patent [19]

Sjöberg

[11] Patent Number: 4,560,006
[45] Date of Patent: Dec. 24, 1985

[54] APPARATUS FOR HOOF WORKING

[76] Inventor: Eigel Sjöberg, Skepparevägen 29, S-432 03 Varberg, Sweden

[21] Appl. No.: 589,806
[22] PCT Filed: Jul. 11, 1983
[86] PCT No.: PCT/SE83/00279
    § 371 Date: Mar. 15, 1984
    § 102(e) Date: Mar. 15, 1984
[87] PCT Pub. No.: WO84/00279
    PCT Pub. Date: Feb. 2, 1984

[30] Foreign Application Priority Data

Jul. 15, 1982 [SE] Sweden ............................. 8204336

[51] Int. Cl.[4] .......................................... A01L 11/00
[52] U.S. Cl. .................................................. 168/48 A
[58] Field of Search .................. 168/44, 45, 47, 48 A, 168/48 R; 269/292, 293, 294

[56] References Cited

U.S. PATENT DOCUMENTS

| 241,942 | 5/1881 | Denton | 168/48 |
| 481,371 | 8/1892 | Pyott | 168/48 |
| 2,523,368 | 9/1950 | Howe | 168/48 |
| 3,834,325 | 9/1974 | DeWilde | 108/96 |

Primary Examiner—Robert P. Swiatek
Attorney, Agent, or Firm—Beveridge, DeGrandi & Weilacher

[57] ABSTRACT

The disclosure relates to an apparatus for working of hooves of horses, on which two abutting faces are placed on each side of a rotating cutter or rasp, whereat one abutting face is placed at the same level as the surface of the rotating cutter or rasp and the other abutting face is placed below the surface of the cutter or rasp so that a part of the working surface of the cutter or rasp is uncovered.

8 Claims, 2 Drawing Figures

U.S. Patent   Dec. 24, 1985   4,560,006
FIG. 1
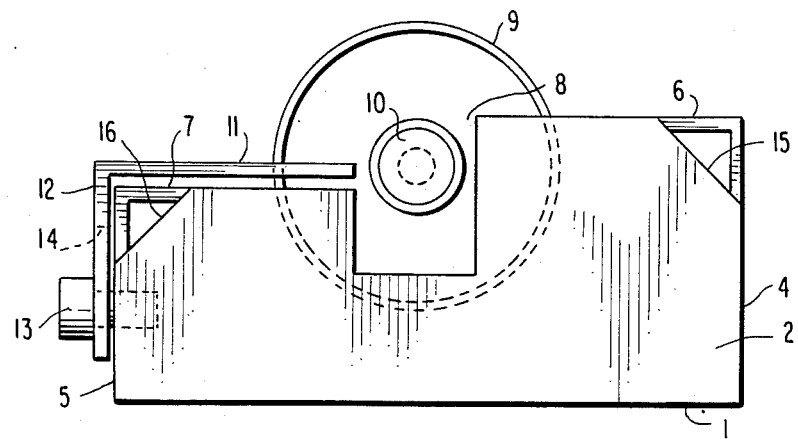
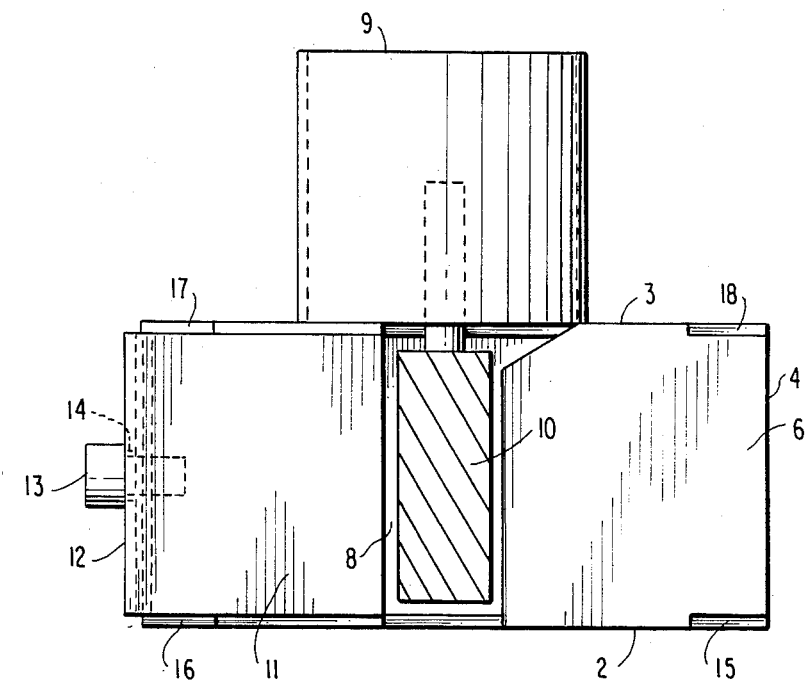
FIG. 2

APPARATUS FOR HOOF WORKING

The present invention relates to an apparatus for hoof working on hoofed animals, especially horses.

Up to now all hoof working is done by hand of specially educated persons, so called farriers, with the help of a hoof blade and a club. Besides the farrier's holding the hoof during the work, he is furthermore to place the hoof blade on a suitable place of the hoof and then by means of the club drive in the hoof blade until desired extent of hoof working and hoof dimension is reached. The the hoof must be made even and adjusted by means of a rasp. As pointed out above, the hoof working must be made completely by hand and is therefore extremely hard work. The hoof work itself requires considerable technique and strength, but the greatest effort is probably required to keep the hoof in its place during the hoof work, which is especially trying when working with nervous and contrary animals. Furthermore considerably greater effort is needed the bigger the animal and its hooves are. The working position is also extraordinarily troublesome and causes a great pressure on both the back and the legs of the person, who is doing the work.

The task forming the basis of the present invention is to produce an apparatus for hoof working, by means of which the work is considerably facilitated.

The task forming the basis of the present invention is solved by that the apparatus mentioned is characterized thereof that two abutting faces are arranged on each side of a cutting tool, that one of the abutting faces is placed at the same level as the surface of the cutting tool and that the other abutting face is placed below the surface of the cutting tool in such a manner that one part of the cutting tool is free to work off material from one hoof, while the other abutting face is bearing on the part of the hoof, which is to be worked on, and said one abutting face will bear on or is bearing on the surface of the hoof formed after the hoof working. Preferably the other abutting face is adjustable for variation of extent of hoof working desired, which is depending on the distance between the abutting faces. The abutting faces are displaced in parallel and the cutting tool is placed in a space between the abutting faces. Furthermore the abutting faces are arranged on a box with openings for dumping the worked off material. The box shows a holder for fastening of the box on a device for driving the cutting tool, preferably a rasp or cutter for rotation by means of a grinding or drilling machine with suitable tool holder, in which case the holder on the box is adjusted to the neck of the grinding or drilling machine.

The present invention makes the work with hooves of horses as well as other hoofed animals considerably easier. It is also possible to use the apparatus according to the invention for working on hooves of for instance cows. The same apparatus can be used for different sizes of hooves. The hooves of an Ardennes carthorse can be worked on as well as the hooves of a pony by means of the same apparatus. After removal of old shoes and nails in a conventional way, the hoof has only to be lifted up and to be hold in one hand, while the apparatus according to the invention is guided around the hoof with the other hand. This part is going quickly and the animal is not exposed to any strain of blows, while the risk of the animal being anxious will be insignificant and can be expected not to appear at all after a certain adjustment to noice and experience. It can even be expected that the animal will find the treatment very pleasant. The work performed will be enough even and exact to be able to eliminate the up to now necessary adjustment by means of a rasp. By means of an apparatus according to the present invention the time for the working of one hoof can be reduced to less than half. By eliminating the strain of blows there is nor any risk of negative influence on or injury to the joints closest to the hooves.

A form of execution of the present invention will be described more precisely in the following by referring to enclosed drawing.

FIG. 1 is principally showing a view from the front of a form of execution of an apparatus according to the present invention.

FIG. 2 shows a view from above of the form of execution in FIG. 1.

The form of execution of the present invention shown on the drawing has mainly the form of a box with a bottom 1, long side walls 2 and 3 and short side walls 4 and 5. Closest to the short side wall 4 the box is equipped with a roof part 6 and closest to the short side wall 5 the box is equipped with a roof part 7. Between the roof parts 6 and 7 there is a room 8. On the long side wall 3 a circular holder 9 is fastened, which is intended for fastening of the box on a driving device (not shown) for a cutting tool 10.

The driving device can be a grinding or drilling machine with suitable tool holder for the cutting tool 10. The cylindrical or circular holder 9 is in this case slitted so that it more easily can be pressed against the neck of the grinding or drilling machine. The cutting tool 10 can be a type of cutter or rasp, which is found to be especially suitable for working of hoof material. The holder 9 is placed on the long side wall 3 so that the surface of the cutting tool 10 is placed at the same level as the roof part 6, which most clearly can be seen in FIG. 1. This figure furthermore shows that the roof surface part 7 is positioned lower with respect to the roof surface part 6, and in that way a part of the working surface of the cutting tool is freely disposed for working purposes.

Above the part 7 an angle part, which has an upper part 11 and an end part 12, is arranged. The upper part 11 is mainly covering the part 7 and runs consequently almost all the way to the cutting tool 10. The part 12 is placed on the outer side of the short side wall 5 of the box and the whole angle part 11, 12 is fastened on the short side wall 5 with the help of a screw 13, which can be of any suitable sort and serves as fastening of the angle part 11, 12 on the short side wall 5. In order to make the angle part 11, 12 adjustable, it is equipped with a continuous notch or a continous cavity 14. After loosening of the screw 13 the angle part 11, 12 can be displaced upwards or downwards on the short side wall 5 for increasing or reducing of the level difference between the upper part 11 and the part 6. In this way the extent of cleaning can be adjusted.

The upper corners of the long side walls 2 and 3 are preferably cut at 15, 16, 17, 18 so that worked off material will not stay in the box.

The apparatus shown in the drawing can be made of a suitable material, for instance a suitable sheet-metal material, whereat the parts attached to each other are welded together. It is however also possible to use other materials, for instances plastic. The sheet-metal can, if so is desired, be stainless.

An apparatus according to present invention is used in such a way, that the rest surface, formed by the upper part 11, is fit to the bottom part of the hoof after starting of the driving device, which rotates the cutting tool 10. Then the cutting tool 10 is pressed against the hoof material, which is to be worked off while bearing on the same by means of the rest surface 11. During the hoof working, the rest surface 11 will thus bear on the material, which is to be worked off, while the abutting face 6 will ear on the new hoof surface, formed after the work. The cutting tool 10 will thus work with the support of both rest surface 11 and rest surface 6.

I claim:

1. An apparatus for working of hooves of hoofed animals, especially horses, comprising a housing having two abutting faces (6, 11) arranged on each side of a cutting tool (10), wherein one of the abutting faces (6) is fixed and placed at the same level as the surface of the cutting tool (10) and the other abutting face (11) is displaced in parallel from the surface of the cutting tool (10), so that part of the cutting tool (10) is free to work off material from a hoof of an animal, said cutting tool (10) being coupled to an output shaft of a drive means so that the shaft of the cutting tool (10) is an axial extension of the output shaft of the drive means, the cutting tool (10) being positioned in a space (8) formed between said abutting faces (6, 11), said housing is provided with a holder (9) which is an extension of the drive means and surrounds the output shaft of the drive means, said extension providing a handgrip for hand holding of the apparatus, said housing providing an end wall (3) of said handgrip, said end wall extending outside of the holder and thereby providing a support for a hand holding the apparatus.

2. The apparatus according to claim 1, wherein the other abutting face (11) is adjustable for variation of desired depth of cutting.

3. The apparatus according to claim 2, wherein the housing is provided with openings (15-18) for dumping the worked material and provides an end of the handgrip.

4. The apparatus according to claim 2, wherein said housing is integral with the holder (9) for fastening of the housing on the drive means of the cutting tool (10).

5. The apparatus according to claim 4, further comprising said cutting tool being a rasp or rotating cutter attached to a grinding or drilling machine with a tool holder.

6. The apparatus according to claim 1, further comprising said extension and at least a part of said drive means providing a handgrip for handling of the apparatus.

7. An apparatus for working of hooves of hoofed animals, especially horses, comprising a housing having two abutting faces (6, 11) arranged on each side of a cutting tool (10), wherein one of the abutting faces (6) is fixed and placed at the same level as the surface of the cutting tool (10) and the other abutting face (11) is displaced in parallel from the surface of the cutting tool (10), so that part of the cutting tool (10) is free to work off material from a hoof of an animal, said cutting tool (10) being coupled to an output shaft of a drive means so that the shaft of the cutting tool (10) is an axial extension of the output shaft of the drive means, the cutting tool (10) being positioned in a space (8) formed between said abutting faces (6, 11), said housing is provided with a holder (9) which is an extension of the drive means and surrounds the output shaft of the drive means, said extension providing a handgrip for hand holding of the apparatus, said housing providing an end wall (3) of said handgrip, said end wall extending outside of the holder and thereby providing a support for a hand holding the apparatus, said other abutting face (11) is adjustable for variation of desired depth of cutting, and, wherein said housing has openings (15-18) for dumping the hoof material cut off and said housing further providing at end of the handgrip.

8. An apparatus for working of hooves of hoofed animals, especially horses, comprising a housing having two abutting faces (6, 11) arranged on each side of a cutting tool (10), wherein one of the abutting faces (6) is fixed and placed at the same level as the surface of the cutting tool (10) and the other abutting face (11) is displaced in parallel from the surface of the cutting tool (10), so that part of the cutting tool (10) is free to work off material from a hoof of an animal, said cutting tool (10) being coupled to an output shaft of a drive means so that the shaft of the cutting tool (10) is an axial extension of the output shaft of the drive means, the cutting tool (10) being positioned in a space (8) formed between said abutting faces (6, 11), said housing is provided with a holder (9) which is an extension of the drive means and surrounds the output shaft of the drive means, said extension providing a handgrip for hand holding of the apparatus, said housing providing an end wall (3) of said handgrip, said end wall extending outside of the holder and thereby providing a support for a hand holding the apparatus, said housing having an opening for dumping the hoof material cut off.

* * * * *